United States Patent [19]

Ogawa

[11] E Re. 29,407

[45] Reissued Sept. 20, 1977

[54] SURFACE EXPOSURE DEVICE FOR COPYING APPARATUS

[75] Inventor: Masaya Ogawa, Osaka, Japan

[73] Assignee: Minolta Camera Kabushiki Kaisha, Osaka, Japan

[21] Appl. No.: 688,073

[22] Filed: May 19, 1976

Related U.S. Patent Documents

Reissue of:

[64] Patent No.: 3,825,339
Issued: July 23, 1974
Appl. No.: 341,782
Filed: Mar. 15, 1973

[30] Foreign Application Priority Data

Mar. 29, 1972 Japan ..... 47-31389

[51] Int. Cl.[2] ..... G03B 27/48; G03B 27/50; G03B 27/70

[52] U.S. Cl. ..... 355/51; 355/8; 355/66

[58] Field of Search ..... 355/8, 51, 66

[56] References Cited

U.S. PATENT DOCUMENTS

| | | | |
|---|---|---|---|
| 3,330,181 | 7/1967 | Jakobson | 355/66 X |
| 3,598,489 | 8/1971 | Thomas et al. | 355/66 X |
| 3,669,535 | 6/1972 | Hyosaka et al. | 355/8 |
| 3,672,762 | 6/1972 | Suzuki et al. | 355/8 X |
| 3,689,146 | 9/1972 | Ito et al. | 355/8 |

*Primary Examiner*—Richard A. Wintercorn
*Attorney, Agent, or Firm*—Wenderoth, Lind & Ponack

[57] ABSTRACT

A surface exposure device for use in a copying apparatus essentially comprising a supporting surface for supporting thereon an original from which a duplicate is desired, a lens assembly, a first carriage having therein a reflective mirror and a second carriage having therein at least one reflective mirror. The first and second carriages are conjointly displaceable in the same direction while the first carriage and the support surface undergo relative motion in opposite directions with respect to each other. Copying material on which the image of the original is to be reproduced is transferred at a velocity substantially equal to the relative velocity of movement of the supporting surface and the first carriage, the second carriage being moved at a velocity substantially equal to one-half of the velocity of the first carriage.

7 Claims, 4 Drawing Figures

SURFACE EXPOSURE DEVICE FOR COPYING APPARATUS

Matter enclosed in heavy brackets [ ] appears in the original patent but forms no part of this reissue specification; matter printed in italics indicates the additions made by reissue.

The present invention relates to a copying apparatus and, more particularly, to a surface exposure device for use in the copying apparatus wherein a transparent supporting surface for supporting the original from which a copy is to be made, and a movable carriage having an exposure aperture or slit and accommodating therein an exposure light source undergo relative motion in parallel relation with respect to each other and a copying material on which an image of the original is to be projected through a lens assembly is transferred at a velocity determined by the relative motion between said supporting surface and said movable carriage in consideration of the magnification of the optical system of the copying apparatus.

Various types of copying apparatus heretofore provided are in practical use, as are various copying processes. However, the U.S. Pat. No. 3,330,181, patented on July 11, 1967, corresponding to the Patentschrift (Germany) Pat. No. 1,215,503 patented on March 14, 1968, discloses an arrangement basically similar to that of the present invention. The optical system disclosed in the above mentioned patent is depicted in the accompanying drawing of FIG. 1. For better understanding of the prior art copying apparatus to which the present invention pertains, reference is first made to FIG. 1.

In FIG. 1, the supporting surface above referred to is designated by S, which is stationarily mounted on a housing structure H of the copying apparatus. A first carriage movable parallel to the supporting surface S on a suitable guide arrangement (not shown) includes an exposure aperture E, at least one exposure light source arranged within the first carriage so as to illuminate the original on the supporting surface S through the exposure aperture E, said light source usually extending at right angles to the direction of movement of the first carriage, and a first reflective mirror M1 tilted 45° with respect to the plane of the supporting surface S.

The prior art copying apparatus further includes a second carriage movable parallel to the supporting surface S on a suitable guide which may be common to the first carriage, and carrying therein a pair of second and third reflective mirrors M2 and M3 stationarily arranged at right angles with respect to each other while the second reflective mirror M2 is positioned in parallel relation to the first reflective mirror M1. A lens assembly of any known construction, generally designated by L, is located at a position intermediate of the distance between the original on the supporting surface S and a copying material C.

In the arrangement shown, rays of light carrying a consecutive image of the original on the supporting surface S selected by the exposure aperture E travel from the original to the lens assembly, first reflected by the first reflective mirror M1, then by the second reflective mirror M2 and finally by the third reflective mirror M3, which are in turn transmitted to the copying material C through an exposure plate P which may be a shutter. So far as the real image reproduction is concerned, the optical distances between the original and the lens assembly L on one hand and between the lens assembly L and the copying material C on the other hand are made equal to each other.

During operation of the copying apparatus, the first and second carriages, i.e., first reflective mirror M1 and the pair of the second and third reflective mirrors M2 and M3, and the copying material C are moved. As the first carriage carrying the first reflective mirror M1 moves with the exposure aperture E scanning a consecutive portion of the original on the supporting surface S illuminated by the light source, the second carriage carrying the second and third reflective mirrors M2 and M3 moves in the same direction as the first carriage at a velocity half the velocity of movement of the first carriage, thereby permitting the optical distances between the original and the lens assembly L and between the lens assembly L and the copying material C to remain the same. The copying material C is transferred at a velocity substantially equal to the velocity of movement of the first carriage whereby the image of the original scanned by the exposure aperture E is reproduced on the copying material C. Upon completion of the scanning of the original, the first and second carriages are returned to the initial positions, respectively, in the opposite direction without changing the ratio of the optical distances between the original and the lens assembly L and between the lens assembly L and the copying material C.

In the prior art copying apparatus of the above construction, the housing structure must be so sized as to accommodate the whole distance of travel of the first carriage and the second carriage frontwardly spaced from said first carriage with respect to the scanning direction, which substantially corresponds to the maximum size of the original falling within the copying capacity of the copying apparatus. This accounts for the fact that the prior art copying apparatus requires the housing structure to be of relatively bulky size and any one of the first and second carriages to travel a relatively long distance and, as a result of the latter, the copying speed is relatively low. As has been experienced, in a sequential operation of the copying apparatus to reproduce a number of duplicates on the basis of the same original, it usually requires a relatively longer time to obtain the first one of the duplicates than the other subsequently reproduced duplicates. This is true of the prior art copying apparatus of the above construction.

Moreover, in the prior art copying apparatus, the fact that any of the first and second carriages reciprocately moves a relatively long distance between start and scannel positions results in that a considerable impact is produced on the housing structure of the apparatus when the carriages begin to move toward the scanned position and also when the carriages begin to return toward the start position upon arrival at the scanned position. In other words, the longer the distance the carriages must travel, the greater the impact which is produced upon sudden start and return of the carriages between the start and scanned positions. The sudden start and return of the carriages between these two positions is especially required in increasing the number of duplicates per unit time and, therefore, unless cushioning means are provided for absorbing the impacts produced, the number of duplicates available per unit time by the prior art copying apparatus is naturally limited. In view of this, the cushioning means are usually provided in the prior art copying apparatus, which is apparently complicated so much as increasing the overall size of the copying apparatus.

Accordingly, an essential object of the present invention is to provide an improved and compact copying apparatus wherein the supporting surface and the pair of first and second carriages undergo relative motion in the opposite directions, thus substantially eliminating the disadvantages inherent in the prior art copying apparatus.

Another important object of the present invention is to provide an improved and compact copying apparatus of the type above referred to, wherein the distance of travel of any of the first and second carriages is reduced to a value substantially corresponding to half the distance of travel of the same required in the prior art copying apparatus, thereby permitting the size of the copying apparatus to reduce.

A further object of the present invention is to provide an improved and compact copying apparatus of the type above referred to wherein the relative movement between the supporting surface and the pair of the first and second carriages in the opposite directions requires the copying material to be transferred at a velocity substantially corresponding to the relative velocity of said movement thereof, thereby increasing the copying speed of the apparatus.

A still further object of the present invention is to provide an improved and compact copying apparatus of the type above referred to, which has the optical system applicable in association with any of the conventionally [practised] *practiced* copying processes.

A still further object of the present invention is to provide an improved and compact copying apparatus of the type above referred to, which can be manufactured easily and at reasonable costs without substantially requiring an additional step of manufacture with respect to the conventionally [practised] *practiced* steps of manufacture.

To this end, according to the present invention, the copying apparatus essentially comprises the supporting surface reciprocally movable between first and second positions, the lens assembly for projecting a consecutive image of the original laying on the supporting surface on to the copying material, and a reflector arrangement located between said supporting surface and said lens assembly and including a plurality of reflective mirrors divided into a first group and a second group, said two groups being conjointly displaceable, said first group being movable in the direction counter to the direction of movement of said supporting surface at the same velocity as said supporting surface and the second group being movable at a velocity half the velocity of said first group, said copying material being transferred at a velocity corresponding to the sum of the velocities of movement of said supporting surface and said first group of said reflector arrangement.

In the above construction, in view of the fact that the stroke of travel of any one of the first and second groups of the reflector arrangement is [advantageourly] *advantageously* reduced to half that required in the prior art copying apparatus, the lens assembly may be of smaller focal length than that used in the prior art copying apparatus. This means that a faster lens assembly than that of the same size employed in the prior art copying apparatus can be advantageously employed in the copying apparatus of the present invention, which in turn results in the reduction of the overall size of the copying apparatus.

Furthermore, according to the present invention, the supporting surface and the first group of the reflector arrangement are operatively connected by means of a single cable so as to render said supporting surface and said first group to be conjointly displaced with respect to each other. Because of this, inertia forces produced upon sudden stoppage of each of the supporting surface and first group act in the opposite directions on the single cable and, consequently, the inertia forces acting on the cable can be advantageously cancelled. Accordingly, no complicated cushioning devices as have been employed in the prior art copying apparatus is substantially required.

These and other features of the present invention will become clear from the following description taken in conjunction with the preferred embodiments thereof with reference to the accompanying drawings, in which.

Figure 1:
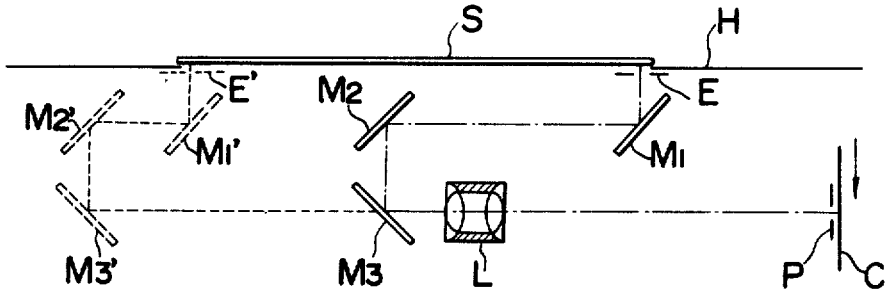
FIG. 1 PRIOR ART
FIG. 1 is a schematic diagram showing the optical system of the prior art copying apparatus, reference to which has been made in the foregoing description.
Figure 2:
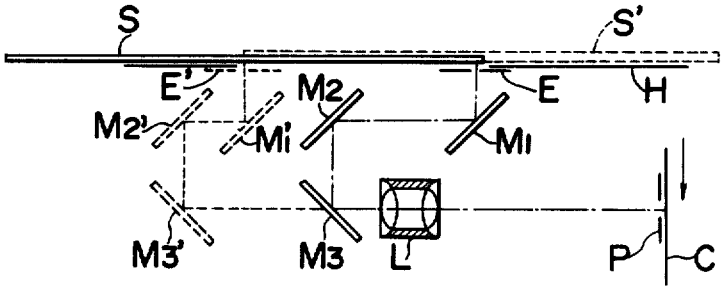
FIG. 2 is a schematic diagram showing the optical system of the copying apparatus according one embodiment of the present invention.
Figure 3:
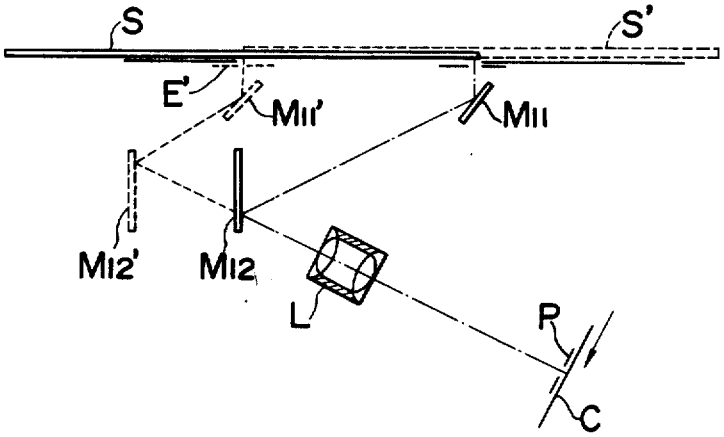
FIG. 3 is a similar diagram to FIG. 2, but showing another embodiment of the present invention.
Figure 4:
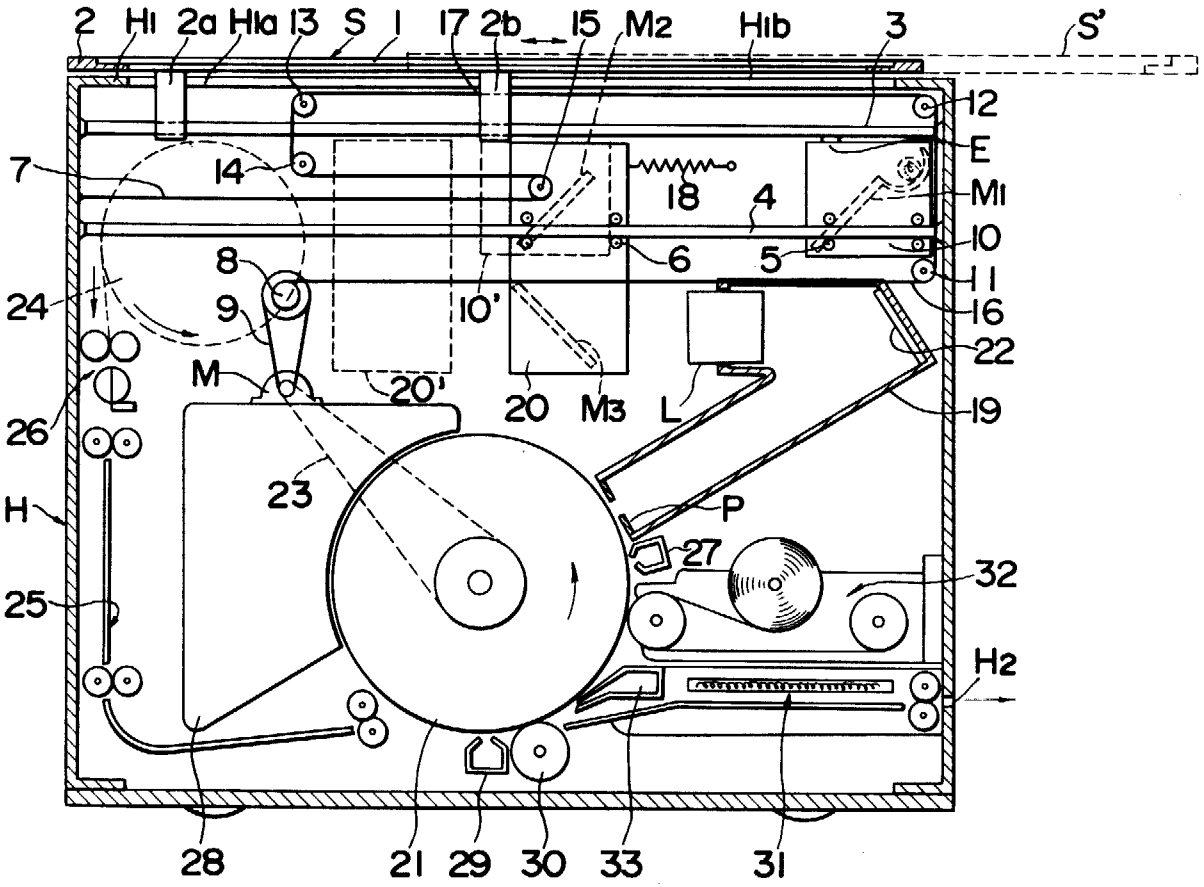
FIG. 4 is a schematic side sectional view of the copying apparatus embodying the optical system of FIG. 2.

Before the description of the present invention proceeds, it is to be noted that, because of a number of similarity between the arrangement of the prior art copying apparatus of FIG. 1 and that of any of FIGS. 2 to 4 according to the present invention, the same reference numerals are employed to designate the same parts throughout the drawings of FIG. 1 to FIG. 4.

Referring first to FIG. 2, the only difference between the arrangement of FIG. 1 and that of FIG. 2 resides in the supporting surface S. In other words, the supporting surface S in the arrangement of FIG. 2 is movable between the first position indicated by the real line and the second position indicated by the dotted line S'. In practice, the stroke of movement of the supporting surface S is substantially half the distance from one edge of the supporting surface S to the opposite edge thereof located in the direction of movement of said supporting surface S. The velocity of movement of this supporting surface S from the first position to the second position is assumed to be Vo.

To obtain the scanning speed, i.e., the speed of travel of the exposure aperture E through which the portion of the original laying on the supporting surface S then moving from the first position to the second position is illuminated by the light source, which is twice the scanning speed effected in the arrangement of FIG. 1, the velocity Va of travel of the first carriage including the reflective mirror M1 and the exposure aperture E must be the same as the velocity Vo of the supporting surface.

As is clearly understood by those skilled in the art, the optical distances between the original on the supporting surface and the lens assembly L on one hand and between the lens assembly L and the copying material C on the other hand should not vary so far as the real image reproduction is concerned. For this purpose, the velocity Vb of the second carriage including the second and third reflective mirrors M2 and M3 must be half the velocity Va of the first carriage.

From the foregoing it is clear that the velocity of movement of the copying material C should be the sum of the velocities Vo and Va, to thereby cause rays of light carrying the image of the original, that have been transmitted to the exposure plate P, to relatively scan the copying material C in synchronism with the scanning speed.

From the foregoing, it has also become clear that the surface exposure device according to the present invention satisfies the following relationships:

$$Vp = Vo + Va$$

$$Vb = \tfrac{1}{2} \cdot Va$$

wherein Vp represents the velocity of the copying material C. In other words, since the relative movement takes place between the supporting surface S and the first carriage in the opposite directions with respect to each other, the copying material C is transferred at the relative velocity. If Vo=Va, it is clear that the copying material C is transferred at a velocity twice the velocity of either of the supporting surface S and the first carriage. This means that the number of duplicates produceable by the arrangement of FIG. 2 is twice that by the prior art arrangement of FIG. 1.

In the arrangement of FIG. 2, the first reflective mirror M1 has been described as tilted at an angle of 45° while the lens assembly L has the optical axis in parallel relation with the plane of the supporting surface S. However, the following arrangement is possible as shown in FIG. 3.

Referring to FIG. 3, the second carriage includes an ustanding mirror M12, the plane of which substantially intersects with the plane of the supporting surface S. While in this condition, the mirror M11, which substantially corresponds to the first reflective mirror M1 of FIG. 2, and the lens assembly L are respectively arranged such that rays of light carrying the image of the original on the supporting surface S are transmitted to the upstanding mirror M12 through said mirror M11, the light rays being in turn reflected by the upstanding mirror M12 on to the lens assembly L. The copying material C must have the plane arranged so as to intersect with the optical axis of the lens assembly.

Even this arrangement of FIG. 3 functions satisfactorily in substantially the same manner as the foregoing embodiment of FIG. 2.

In either of these embodiments of FIGS. 2 and 3, as is well known to those skilled in the art, either the optical distance between the original on the supporting surface S and the lens assembly or the distance between the lens assembly L and the copying material must be of a value twice the focal length F of the lens assembly L so far as the real image reproduction is concerned. However, if the lens assembly L is axially moved, the magnification of the image of the original projected onto the copying material through the exposure plate P can be varied. In this case, the position of the second carriage must be correspondingly adjusted. More specifically, if the lens assembly L is axially displaced in a distance represented by an equation $F(1-m)$, wherein m is a desired magnification of the image of the original projected on the copying material C, the second carriage must be correspondingly displaced in the same direction in a distance represented by an equation $F(1-m)^2 \times \tfrac{1}{2} \cdot m$ and the copying material C must also be transferred at a velocity represented by the following equation:

$$Vp = m(Vo + . Va)$$

Even if the lens assembly L and the second carriage are respectively displaced in the manner as hereinbefore described, the ratio of the optical distances between the original and the lens assembly L on one hand and between the lens assembly L and the copying material C on the other hand remain the same throughout operation of the copying apparatus.

Furthermore, in any of the foregoing embodiments of FIGS. 2 and 3, the following alternative is possible. Assuming that the length of the original to be scanned by the exposure aperture E is 1, if the supporting surface S movable at the velocity Vo is made to travel a distance one third of the length 1 and the first carriage is made to travel a distance corresponding to the remaining length, i.e., $\tfrac{2}{3} \cdot 1$, relative to said surface S at the velocity Va with the copying material C transferred at the velocity Vp=Vo +. Va, a single duplicate can be reproduced in a period of time corresponding to two third that required in the prior art copying apparatus shown in FIG. 1 and, accordingly, the copying speed can be improved to 3/2 times that of the prior art copying apparatus.

Thus, any one of the arrangements of FIGS. 2 and 3 according to the present invention is very advantageous in the various respects mentioned in the foregoing description.

FIG. 4 shows the details of the copying apparatus embodying the optical arrangement shown in FIG. 2, reference to which will be hereinafter made. However, it is to be noted that the first and second carriages mentioned in the foregoing description are respectively designated by 10 and 20.

The housing structure H is of a box-like shape having an upper plate H1 formed with a guide slot H1a extending along each side edge thereof and also having a square-cornered opening formed as at H1b. This housing structure H carries the supporting surface S, composed of a transparent material such as reinforced glass 1 and a frame 2. The frame 2 has on both sides thereof at least one pair of brackets 2a and 2b rigidly connected thereto and slidably mounted on a common rod 3 for movement in the opposite directions as indicated by the arrow. The positions of the brackets 2a and 2b should be selected such that the supporting surface S can be permitted to travel towards the right in a distance half the length of the supporting surface S at the velocity Vo.

The first carriage 10 and the second carriage 20 are both mounted on a guide rail 4 extending in parallel relation with the rod 3 by means of a plurality of sets of rollers respectively generally indicated by 5 and 6, the rollers of each pair being supported by the first or second carriage 10 or 20 and rotatably sandwiching the guide rail 4.

These supporting surface S, first carriage 10 and second carriage 20 are moved by a motor M by means of a single cable 7 in a respectively predetermined manner so as to satisfy the operational relationships described in the foregoing with reference to FIG. 2. More specifically, the cable 7 has one end rigidly connected to a portion of the housing structure H and the other end rigidly connected to a take-up pulley 8 adapted to be driven by the motor M by means of an endless belt 9. From the take-up pulley 8, the cable 7 extends towards an idler wheel 11 rotatably supported by the housing structure H, and then bent towards an idler wheel 12 rotatably supported by the housing structure H and positioned above said idler wheel 11. The cable 7 further extends from the idler wheel 12 towards an idler wheel 13 rotatably supported by the housing structure H at a position substantially above the motor M, and then turns therearound towards an idler wheel 14 positioned below the idler wheel 13. The portion of the cable between said first mentioned end thereof and the idler wheel 14 is turned round an idler pulley 15 rotatably carried by the second carriage 20. The first carriage 10 is connected with the cable 7 as at 16 and the supporting surface S having the bracket 2b connected with the cable as at 17.

A tension spring 18 having one end rigidly connected with a portion of the housing structure H and the other end rigidly connected with the carriage 20 acts to bias the second carriage 20 in one direction and concurrently maintain the cable 7 under tension.

The arrangement so far described is designed such that, when the motor M is operated in one direction, for example, in the counterclockwise direction, while the various movable parts are respectively conditioned as shown in FIG. 4, the take-up pulley 8 of the construction as will be mentioned later correspondingly rotates so as to wind up the cable 7 at such a velocity as to permit the supporting surface S and the first carriage 10 to move respectively to the right and to the left in synchronism with each other at the respective velocities Vo and Va and the second carriage 20 to move in the same direction as the first carriage 10 at the velocity of $\frac{1}{2}$·Va. At the time of completion of travel of each of these movable parts S, 10 and 20, they are conditioned as indicated by the dotted lines S', 10' and 20', respectively.

It is to be noted that the take-up pulley 8 should be understood as having a clutch mechanism (not shown) by which, upon completion of travel of the movable parts S, 10 and 20 to the respective positions S', 10' and 20', transmission of a rotational force produced by the motor M to said pulley 8 is interrupted, while said motor M is continuously rotated, thereby permitting the cable 7 to move in the opposite direction so as to return the movable parts to the respective initial positions by the action of the tension spring 18, said transmission of said rotational force being effected when said movable parts are in the initial positions.

A substantially J-shaped conduit 19 having one end adjacent to the second carriage 20 and mounted with the lens assembly L and the other end adjacent to the selenium plated drum 21 and mounted with the exposure plate P, is stationarily supported within the housing structure H. This conduit 19 is provided therein with a reflective mirror 22 rigidly supported thereby in position to reflect the rays of light passing through the lens assembly L onto the selenium plated drum 21.

The drum 21 is rotatably supported within the housing structure H so as to be rotated by the motor M by means of an endless belt or chain 23 at a peripheral velocity equal to the sum of the velocities of the supporting surface S and the first carriage 10.

The copying process employed in the instance as shown in FIG. 4 is a known xerographic process and operates in the following manner.

A web of paper from a roll 24 of paper housed within the housing structure H is fed to the drum 21 through a conveyor arrangement generally indicated by 25 and shown as formed by a plurality of pair of rollers, some or all of which are synchronously driven by the motor M so as to feed the paper towards the drum 21. A cutter arrangement 26 is provided in any position, for example, between the paper roll 7 and the conveyor arrangement 25 for cutting the [pape] *paper* from the paper roll 7 to provide a web of paper of desired length. The web of paper fed to the drum 21 is then transferred to an exit H2 formed in the housing structure H in a manner as will be mentioned later.

Shortly before the web of paper is fed to the drum 21 through the conveyor arrangement 25 and upon actuation of the copying apparatus, the drum 21 is rotated in the counterclockwise direction as indicated by the arrow. During rotation of the drum 21 through 360° the selenium plated drum 21 is first electrically charged in a predetermined polarity by a first charger 27 arranged in the vicinity of the drum 21 at a position preceding the exposure plate P. As a portion of the peripheral surface of the drum 21 electrically charged by the charger 27 passes through the exposure plate P, static electricity is grounded except for a portion thereof exposed to the rays of light carrying the image of the original and passing through the exposure plate P.

As the drum 21 further rotates prior to completion of the 360° rotation, a developing unit 28 positioned following the exposure plate P acts to spread over the peripheral surface of the drum 21 fine powder known as toner, which remains on the peripheral surface of the drum 21 in a particular pattern representing the image of the original on the supporting surface S. The powder on the drum 21 is subsequently transferred to the web of paper, that has been electrically charged by a second charger 29, as said web of paper passes between the drum 21 and a transfer roll 30 elastically biased to said drum 21. The paper passing through the transfer roll 30 is then fed to the exit H2 through a heating unit 31 wherein the powder having been transferred onto the web of paper is fixed thereon.

Shortly before completion of the 360° rotation, the drum 21 is cleaned by a cleaner unit 32 of any known construction in readiness for the subsequent copying operation. It is to be noted that reference numeral 33 indicates a blower for applying a blast of air in between the peripheral surface of the drum 21 and the web of paper emerging from the transfer roll 30 thereby to ensure a reliable transfer of the web of paper onto the heating unit 31.

The copying process and its related mechanical arrangement in the foregoing description does not consititute the subject matter of the present invention and, accordingly, the application of the surface exposure device according to the present invention should be understood as not limited thereto, but any of known copying processes. In any event, it is clear that, although the drum 21 is described as rotated at the peripheral velocity equal to the sum of the velocities of the supporting surface S and the first carriage 10, the copying material, i.e., the web of paper, is fed past the transfer roll 20 at the same velocity.

From the foregoing description, it has now become clear that the present invention has many advantages over the prior art copying apparatus as described before. However, various changes and modifications are apparent to those skilled in the art and, therefore, unless otherwise they depart from the true scope of the present invention, they should be construed as included within said true scope of the present invention.

What is claimed is:

1. A device for the optical exposure of an original on copying material which is movably arranged, comprising a housing structure; a support surface horizontally slidably provided in one housing wall and made of transparent material, the original being arranged on the support surface; an exposure plate provided in the housing structure spaced from the support surface and over which the copying material is moved; exposure means arranged between the support surface and the exposure plate and including a lens assembly arranged in the housing structure in position to transmit rays of light carrying an image of the original towards the copying material through the exposure plate; a reflector arrangement located between the lens assembly and the support surface and including a plurality of mirrors divided into first and second groups, the two groups being conjointly displaceable and the first group being movable reciprocally in the direction opposed to the direction of travel of the support surface; guide means arranged in the housing for guiding the groups of mirrors for conjoint movement parallel to the direction of travel of the support surface; and control means connected to the first and second groups of mirrors and the support surface and operable, upon movement of the mirrors, to modify a first ray path between one mirror of the first group and at least one mirror of the second group in a manner equal and opposite to the modification of a second ray path between at least one mirror of the second group and said lens assembly, whereby an image ray extending between the support surface and [one mirror] said lens assembly, produced on exposure of the original, always follows a path of constant length regardless of the position of a mirror with respect to the original, said control means also operable, upon said movement of the mirrors, to move the support surface in the opposite direction to the direction of travel of any of said first and second groups, said support surface, said first and second groups and said copying material satisfying the following relationships.

$$Vp = Vo + . Va$$

$Vb = \frac{1}{2} \cdot Va$ wherein Vp is a velocity of transference of the copying material, Vo and Va are velocities of movement of the support surface and the first group, respectively, and Vb is a velocity of movement of the second group.

2. The device as claimed in claim 1, wherein Vo is equal to Va.

[3. The device as claimed in claim 1, wherein said lens assembly and said second group are adjustable in a distance equal to $F(1-m)$ and in a distance equal to $F(1-m)^2 \times \frac{1}{2} \cdot m$, respectively, in synchronism with each other, wherein F is the focal length of the lens assembly and m is a desired magnification of the image of the original to be reproduced on the copying material, and said copying material is transferred at a velocity equal to the product of $Vo+Va$ by the desired magnification.]

4. The device as claimed in claim 1, wherein said mirror of said first group is tilted at an angle selected such as to reflect the rays of light from the original on to said at least one mirror of the second group.

5. The device as claimed in claim 1, wherein said second group further includes an additional mirror, said additional mirror and said one mirror of said second group being arranged at right angles with respect to each other while said mirror of said first group is tilted at 45° with respect to the plane of the support surface, whereby the rays of light carrying the image of the original travel, after having been reflected by the mirror of the first group to the lens assembly is first reflected by the mirror of said second group and then by said additional mirror.

*6. A device for the optical exposure of an original onto a moving copying material for obtaining 1:1 copying, said device comprising:*

*a horizontally and reciprocatingly movable support surface on which an original to be copied is placed;*

*an optical means disposed below said support surface and including a lens, and reciprocatingly movable first and second mirror means arranged in an optical path between said support surface and said lens, said first and second mirror means being movable opposite to the direction of the movement of said support surface during scanning of an image of the original onto the copying material; and*

*said support surface, said first and second mirror means and said copying material satisfying the following relationships,*

$$Vp = Va + Vo$$

$$Vb = \frac{1}{2} \cdot Va,$$

*wherein Vp is a velocity of transference of the copying material, Vo and Va are velocities of movement of the support surface and the first mirror means respectively, Vb is a velocity of movement of the second mirror means.*

*7. The device as claimed in claim 6, wherein said first and second mirror means are parallelly moveable with respect to said support surface.*

*8. A device for the optical exposure of an original onto a moving copying material for obtaining 1:1 copying, said device comprising:*

*a horizontally and reciprocatingly movable support surface on which an original to be copied is placed;*

*an optical means disposed below said support surface and including a lens, and reciprocatingly movable first and second carriages arranged in an optical path between said support surface and said lens;*

*said first carriage having therein a first mirror means for reflecting an image of the original, and said second carriage having therein a second mirror means for reflecting the image from said first mirror means to said lens;*

*a single cable connecting said support surface and said first and second carriages and a take-up pulley means connected to a first end of said cable means;*

*said cable, upon driving of said take-up pulley means, comprising means for moving said first and second carriages and said support surface, with said first and second carriages being moved in a direction opposed to the direction of movement of said support surface;*

*said first and second carriages being moved at relative velocities of 1 to ½; and*

*means for moving the copying material at a velocity corresponding to the sum of the velocities of said support surface and said first carriage.*

* * * * *